(12) United States Patent
Winkel

(10) Patent No.: US 8,931,336 B2
(45) Date of Patent: Jan. 13, 2015

(54) METHOD OF MEASURING AND TESTING A WORKPIECE AND GEAR CUTTING MACHINE

(75) Inventor: Oliver Winkel, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 282 days.

(21) Appl. No.: 13/401,714

(22) Filed: Feb. 21, 2012

(65) Prior Publication Data

US 2012/0213602 A1 Aug. 23, 2012

(30) Foreign Application Priority Data

Feb. 22, 2011 (DE) .......................... 10 2011 011 946

(51) Int. Cl.
*B23F 23/12* (2006.01)
(52) U.S. Cl.
CPC ................................. *B23F 23/1218* (2013.01)
USPC .......................................................... 73/162
(58) Field of Classification Search
USPC ................. 73/162; 33/501.7, 501.15, 501.16; 29/564
See application file for complete search history.

(56) References Cited

U.S. PATENT DOCUMENTS

| | | | | |
|---|---|---|---|---|
| 3,686,801 A | * | 8/1972 | Ellwanger | 451/337 |
| 4,276,699 A | * | 7/1981 | Sterki et al. | 33/501.9 |
| 4,488,359 A | * | 12/1984 | Misson | 33/501.8 |
| 4,520,700 A | * | 6/1985 | Herzog et al. | 82/148 |
| 5,174,070 A | * | 12/1992 | Losch et al. | 451/7 |
| 5,609,058 A | * | 3/1997 | Gnadt et al. | 73/162 |
| 7,748,131 B2 | * | 7/2010 | Finkenwirth et al. | 33/501.13 |
| 8,567,039 B2 | * | 10/2013 | Neumaier et al. | 29/564 |
| 2005/0252017 A1 | * | 11/2005 | Blondeau | 33/502 |
| 2007/0277610 A1 | * | 12/2007 | Landvogt et al. | 73/587 |
| 2008/0056837 A1 | * | 3/2008 | McGlasson et al. | 409/61 |

FOREIGN PATENT DOCUMENTS

| | | |
|---|---|---|
| DE | 19519429 C1 | 10/1996 |
| DE | 10044879 A1 | 4/2002 |
| DE | 69521704 T2 | 5/2002 |
| DE | 102009008120 A1 | 8/2010 |

* cited by examiner

*Primary Examiner* — Hezron E Williams
*Assistant Examiner* — Xin Zhong
(74) *Attorney, Agent, or Firm* — Alleman Hall McCoy Russell & Tuttle LLP

(57) ABSTRACT

The present disclosure relates to a method of measuring and inspecting a workpiece belonging to a gear pair, wherein the method is carried out on a gear cutting machine producing the workpiece, wherein a mating test piece mounted at the working head, in particular at the cutting head, is moved in the direction of the workpiece clamped in the workpiece mount of the machine table until the gear pair is in engagement and the corresponding working axial spacing is reached, the workpiece is driven via the drive movement of the mating test piece of the gear pair, the rotational position of the workpiece to be measured is recorded and the detected actual position is compared with a reference position and at least one value characterizing the rolling gear deviation of the workpiece is calculated while taking account of the comparison made.

16 Claims, 5 Drawing Sheets

METHOD OF MEASURING AND TESTING A WORKPIECE AND GEAR CUTTING MACHINE

CROSS REFERENCE TO RELATED APPLICATIONS

This application claims priority to German Patent Application No. 10 2011 011 946.9, entitled "Method of Measuring and Testing a Workpiece and Gear Cutting Machine", filed Feb. 22, 2011, which is hereby incorporated by reference in its entirety for all purposes.

TECHNICAL FIELD

The present disclosure relates to a method of measuring and of testing a workpiece belonging to a gear pair.

BACKGROUND AND SUMMARY

Gear pairs are to be understood as the combination of any desired gears with their matching mating gears. These include, for example, worm and worm gear or also two or more mutually matching cylindrical gears or spur gears. The running properties of a toothing arrangement are determined by the shape and by dimensional deviations of the partners involved in the meshing. Measurements are therefore carried out at the produced gear with which individual kinds of deviations can be determined to evaluate the transmission behavior.

With worm gears, the check frequently takes place in the form of a rolling gear test on a separate measurement device. To check the worm wheels, they are subjected to a single-flank rolling gear test in accordance with the standards DIN 3960, VDI/VDE 2608 and VDI/VDE 2609. In this respect, the produced worm wheel is paired with its worm/test worm and the joint effect of their individual deviations on the rolling process is determined as the rolling gear deviation.

It is disadvantageous in the described process that the manufactured gears first have to be removed from the producing gear cutting machine and have to be introduced into a separate measurement apparatus. If unpermitted dimensional deviations are determined by the separate measurement apparatus, the laborious and/or expensive return of the workpiece to the gear cutting machine takes place to correct the determined deviations by a reworking.

A frequent transfer of the workpiece to be manufactured between the gear cutting machine and the measurement apparatus is in particular not acceptable in the mass production of gears. The feedback of the determined defects to the gear cutting machine also usually does not take place automatically. Possible correction steps have to be worked out independently and programmed manually at the gear cutting machine.

It is therefore the object of the present disclosure, to import a comparable measuring process into a producing gear cutting machine.

In one example, this object is achieved by a method in accordance with a method for measuring a workpiece belonging to a gear pair, wherein the method is carried out on a gear cutting machine producing the workpiece. A separate measurement apparatus is accordingly not required. The gear pair is either a worm gear with a worm wheel engaging into a worm or a cylindrical gear pair which comprises two mutually meshing cylindrical gears or spur gears.

In accordance with the method in accordance with the present disclosure according to one embodiment, in a first method step, a mating test piece mounted at the working head, in particular at the cutting head, is moved in the direction of the workpiece clamped in the workpiece mount of the machine table until the gear pair formed from the mating test piece and the workpiece is in engagement and optionally until the corresponding axial working spacing has been reached. The supply can additionally or alternatively take place by moving the tool mount in the direction of the working head.

A worm wheel located in the workpiece mount is preferably measured by a test worm mounted at the working head, in particular at the cutting head, of the gear cutting machine.

In a next method step, the clamped workpiece is driven via the drive movement of the mating test piece. The test worm rotating at the working head, for example, produces a rotational movement of the worm wheel clamped in the workpiece mount. Depending on the direction of rotation of the mating test piece, either the right hand flank or the left hand flank of the gear pair is located at the mutual engagement point. The axis of rotation of the mating test piece is optionally approximately at a right angle to the axis of rotation of the workpiece.

The respective rotational position of the workpiece to be measured is recorded over a specific period of time and is provided to a subsequent evaluation, in particular to a comparison of the workpiece rotation in relation to the test worm rotation. The recording takes place, for example, over at least one complete revolution of the test piece.

In the subsequent evaluation, the comparison of the actually detected actual position with a corresponding reference position takes place, with at least one value characterizing the rolling gear deviation of the workpiece being calculated on the basis of the comparison made. The reference position used for the comparison is known and optionally corresponds to a comparable gear pair with an almost ideal shape and dimensional deviation of the partners involved in the engagement. The determined values provide a conclusion on possible kinematic defects of the gear pair, in particular of the workpiece, under real operating circumstances.

The previously described method in accordance with the present disclosure can optionally be carried out on a gear cutting machine having a direct drive in the working head, in particular in the cutting head, and having a direct drive in the table drive. It is, however, also conceivable to carry out the method in accordance with the present disclosure on a gear cutting machine having a transmission machine table. The method in accordance with the present disclosure can be carried out equally on gear cutting machines having a vertically orientated workpiece axis or having a horizontally orientated workpiece axis.

An alternative embodiment of the method is in particular suitable for carrying out on a gear cutting machine having conventional axial drives. The assembly of the mating test piece takes place either at the working arbor, in particular the cutting arbor of the gear cutting machine, or at an additionally arranged special arbor.

Analogously to other methods described herein, the mating test piece is brought into engagement with the workpiece clamped in the workpiece mount until the corresponding axial working distance is achieved between the formed gear pair and the clamped workpiece is set into rotation by the rotational drive movement of the mating test piece.

The difference is that now instead of the actual rotational position of the workpiece, the transposition of the mating test piece relative to the workpiece is recorded and is used for the subsequent calculation of at least one value characterizing the rolling gear deviation of the workpiece. The transposition is caused by deviations in the rotational transmission between the workpiece and the mating test piece. The evaluation of the transposition serves the determining of the rolling gear deviation of the gear pair formed from the workpiece and the mating test piece. The transposition can either be measured directly or can be derived indirectly from suitable measurement variables.

A calculation of the values for the single-flank rolling gear test optionally takes place on the basis of the recorded transposition of the mating test piece relative to the workpiece in conjunction with the known gear ratio of the gear pair.

The method presented is in particular suitable for gear cutting machines which comprise a large machine table with a high moment of inertia.

The transposition of the mating test piece relative to the workpiece can be determined directly with the aid of a displacement transducer. A direct measuring sensor or an inductive measurement sensor have proved particularly suitable.

Alternatively, the transposition can be derived indirectly from one or more suitable measurement variables. The named deviations of the rotational transmission indirectly generate a variation in the engaging force on the mating test piece in a specific direction, i.e., either leading or trailing. The mating test piece optionally undergoes a variation in the applied force which acts parallel to the axial direction of the test object. Accordingly, the required transposition can be determined from the measured force variation and information can be given on the transmission uniformity of the gear pair.

The measurement of the force variation expediently takes place via a load cell, in particular a pressure load cell, fastened to the special arbor. The mating test piece is in this respect expediently in engagement with the workpiece to be measured in a spring-loaded manner so that induced force variations of the force acting in the spring direction can be detected by the pressure load cell.

If the mating test piece is mounted at the working arbor of the gear cutting machine, the force acting on the mating test piece is alternatively determined with reference to the required positional regulation torque. The addressed positional regulation of the gear cutting machine is usually necessary to regulate a corresponding machine axis in its position relative to the workpiece center. A statement can be made on the applied forces or the force directions in the axial direction of the matching test piece with reference to the torque of the responsible axial drive applied due to the regulation. Information on pitch fluctuations in particular results.

A combination of the two methods in accordance with the present disclosure presented is generally permissible to achieve a redundant measurement procedure and measured value evaluation.

It may be expedient in a supplementary method step before the method performance to move the outer diameter of the mounted mating test piece toward a provided reference surface of the gear cutting machine. Thermal machine influences which falsify an exact positional determination of the mating test pieces can be compensated by the movement toward the reference surface. A compensation of the thermal influences is also possible by the use of a test collar at the mating test pattern. An alternative which is equally conceivable would be the use of a measuring sensor.

In an advantageous embodiment of the method in accordance with the present disclosure, the tooth space width of the workpiece is determined via the mounted mating test piece before the driving of the workpiece. The mating test piece is shifted tangentially to the workpiece until a tooth contact between the workpiece and the mating test piece can be determined. The path width of this linear movement is an indication of the tooth space width. Alternatively, the workpiece is rotated relative to the mating test piece up to tooth contact. A statement on the tooth space width can likewise be made with reference to the angle of rotation covered.

A conclusion on tooth space width can in particular be made by evaluation of the positional regulation parameters of the shift axis of the mating test piece or of the axis of rotation of the workpiece.

The rotational flank play of the gear pair in accordance with DIN 3975 is expediently determined by rotation of the mating test piece about its drive axis of rotation in both rotational directions up to flank contact. The rotational play is optionally derived using the read out positional regulation parameters of the corresponding machine axis.

To avoid any lifting of the tooth flank of the mating test piece from the tooth flank of the workpiece during the driving of the workpiece by the mating test piece, the application of a small braking torque onto the workpiece is expedient. The required braking torque is optionally effected by the machine table drive.

At least one value characterizing the rolling gear deviation of the workpiece corresponds to the standardized single-flank rolling gear deviation for gear pairs in accordance with the standards VDI/VDE 2608, DIN 3960. The single-flank rolling gear deviation is the fluctuation of the actual rotational position with respect to the reference rotational position or the fluctuation of the force variation. It results as the difference of the largest leading and the largest trailing rotational position deviation or force deviation with respect to an initial value within a revolution of the workpiece to be tested.

Alternatively or additionally, at least one value characterizing the rolling gear deviation of the workpiece corresponds to the single-flank tooth-to-tooth error. The tooth-to-tooth error is the maximum difference which occurs on the rotational position deviations within a rotational angle corresponding to the duration of a tooth engagement. The tooth-to-tooth error can be calculated analogously from the detected force deviation.

There is also the possibility that at least one value characterizing the rolling gear deviation of the workpiece is the longwave portion and/or the shortwave portion of the single-flank rolling gear deviation. The longwave portion is determined from the test image obtained in the single-flank rolling gear test by calculation and drawing a "polyline creating a mean" in which the shortwave portions are suppressed.

The shortwave portions result from the differences between the recorded test image line and the "polyline creating a mean". The frequency per wheel circumference of the shortwave portions normally coincides with the tooth number of the workpiece to be tested. These portions can, however, also contain the influences of waviness portions in the shape deviations of section lines or flank lines.

The determination of the values optionally takes place by software control.

The output of at least one of the calculated values takes place visually, in particular graphically, by a display unit of the gear cutting machine, such as a monitor. It can be expedient for a later statistical evaluation within mass production to archive one or more values characterizing the rolling gear deviation of the workpiece.

Additional information can be acquired in the measurement of the workpiece from a contact pattern test. A contact pattern test of the workpiece to be checked can be carried out as a subsequent method step by coloring a flank of the mating test piece with marker color, in particular engineer's blue. The evaluation of the contact pattern taken can take place either manually by the machine operator or in an automated manner by an image processing system of the gear cutting machine. The coloring optionally takes place manually by the machine operator, but can also take place by an automated additional method step within the gear cutting machine.

In a preferred embodiment of the method in accordance with the present disclosure, the influence of a possible correction of the tool pivot angle on the contact pattern can be checked by modification of the pivot angle of the mating test piece during the contact pattern test/rolling gear test.

A fully automated tool change within the gear cutting machine is possible to allow the measurement of the produced workpiece within the gear cutting machine to run without human intervention. The processing tool, in particular a cutter, is replaced with a mating test piece. After the method in accordance with the present disclosure has been carried out, the mating test piece is removed again and is replaced with the required tool. This is in particular sensible when the evaluation of the values characterizing the rolling gear deviation of the workpiece makes a reworking of the workpiece necessary.

In this connection, the method in accordance with the present disclosure can put forward at least one proposal for a required reworking of the measured workpiece. After selection or confirmation of one or more correction proposals, the reworking is carried out in an automated manner within the gear cutting machine. The gear cutting machine can generally select the best proposal itself and can carry it out independently.

The present disclosure relates to an alternative method of testing a workpiece belonging to a gear pair, wherein the gear pair is either a worm gear or a cylindrical gear pair. In accordance with the present disclosure, a contact pattern test is carried out subsequent to the manufacturing process of the workpiece on the gear cutting machine producing the workpiece.

The workpiece previously had to be clamped into an external measuring machine for the contact pattern test with known gear cutting machines. If the contact pattern image shows an insufficient result of the workpiece with respect to the quality standard, a return of the workpiece to the gear cutting machine for rework is necessary. These method steps, which have to be carried out manually, are repeated for so long until a satisfactory production result is achieved.

The method in accordance with the present disclosure simplifies and accelerates the above-addressed production and test by a multiple. The machine operator machines the workpiece, for example the gear wheel, prepares the contact pattern on the gear cutting machine and can optionally simulate the influence on the contact pattern by modifications of the machine settings and can subsequently immediately recut the workpiece (worm wheel) with the amended setting parameters after the replacement of the test worm with the gear cutting tool. The total procedure of unclamping/measuring/reclamping is now limited to the measuring cycle on the gear cutting machine. Consequently, no clamping errors due to the reclamping occur either. This can result in a higher production quality.

The present disclosure further relates to a gear cutting machine for machining and measuring a workpiece, in particular for machining and measuring a worm wheel/worm and/or cylindrical gear, having a device for carrying out the methods described herein.

The gear cutting machine in accordance with the present disclosure optionally includes the required drive units for carrying out the corresponding movements of the mating test piece and of the workpiece respectively as well as expediently corresponding drive regulations which allow a recording of the required measured value parameters. The gear cutting machine furthermore provides a calculation device in the form of an electronic control unit which performs a control of the machine axes in accordance with the method and calculated at least one value which characterizes the rolling gear deviation of the clamped and measured workpiece in dependence on the recorded measurement parameters. For example, the electronic control unit may include non-transitory computer readable media include code or instructions for carrying out the method steps as described herein based on data determined from sensor coupled in the gear cutting machine and coupled to the control unit, for example. Devices, in particular a suitable loading apparatus such as a ring loader, are furthermore provided which permit a reversible automatic change between tool and mating test piece. Devices, such as the control unit, are furthermore present for carrying out a contact pattern test of the workpiece to be tested in the gear cutting machine. The devices serve the preparation of the contact pattern and, optionally, the automatic checking or evaluation of the prepared contact pattern.

Provision can be made for the measurement of the transposition of the mating test piece relative to the workpiece and of the forces acting parallel to the axis of rotation of the mating test piece that at least one displacement transducer and/or at least one spring package as well as at least one pressure load cell are arranged on or at the tool arbor taking up the mating test piece. This allows a spring-loaded bringing into engagement of the mating test piece with the tool workpiece to be measured, whereby force fluctuations which occur can be detected by the mounted pressure load cell. Devices, such as sensors, are further optionally provided which record the detected transposition or the detected pressure fluctuations or force fluctuations and forward them to the control unit. The measured values allow a conclusion on the tool transposition or test piece transposition due to defects on the counter wheel. Suitable displacement transducers are optionally direct measuring sensors, inductive measurement sensors, etc.

Further advantages and particulars of the present disclosure will be explained in detail in the following with reference to an embodiment shown in the drawings.

DETAILED DESCRIPTION

Figure 1:
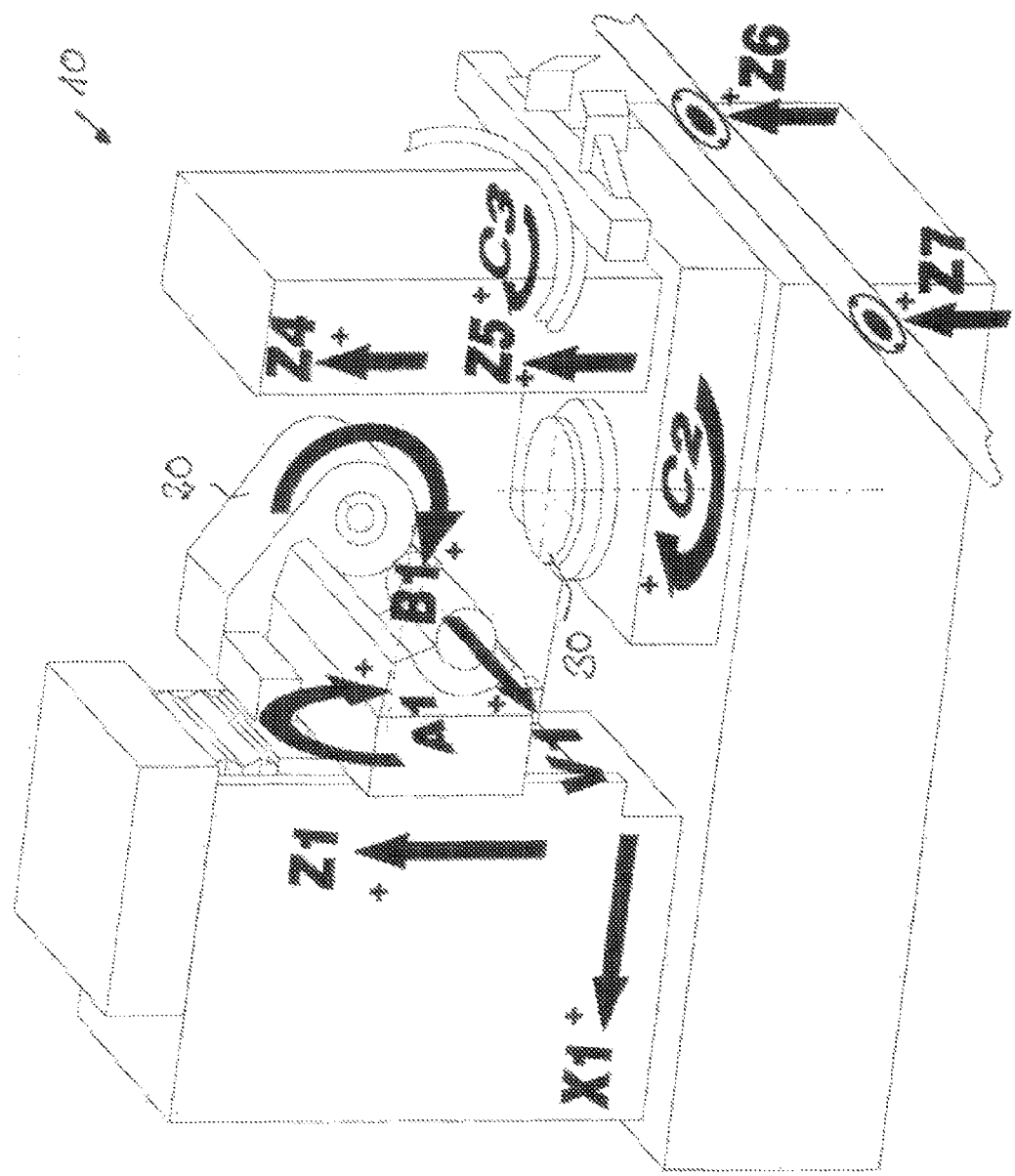
FIG. 1 shows a perspective side view of the CNC machine tool in accordance with the present disclosure for carrying out the method.

FIG. 1 shows a representation of a CNC gear cutting machine 10. In the perspective representation of the CNC gear cutting machine 10 for profiling, the machine-controlled movement axes for the manufacture and the measurement in accordance with the present disclosure of workpieces are drawn in. The gear cutting machine has five standard axes which can be divided into the three linear axes X1, Z1, V1 and the three rotational axes A1, B1 and C2. The rotational axis A1 serves for inwardly pivoting the tool mounted at the working head 20; the rotational axis B1 is responsible for the working rotational movement of the tool used or of the test worm, in particular of the clamped cutter; and the rotational axis C2 designates the rotational movement of the workpiece clamped into the workpiece mount of the machine table 30 and not shown. The three linear axes X1, Z1 and V1 serve the carrying out of a radial movement (X1) of the tool, a feed movement (Z1) of the tool and a tangential movement (V1) of the tool.

In accordance with the present disclosure, the single-flank rolling gear test of a worm wheel produced in the gear cutting machine 10 takes place after the completion of the required machining steps. The cutter mounted at the working head 20 is replaced with a test worm, not shown. The test worm is subsequently pivoted into its measurement alignment by pivoting the A1 axis. To compensate thermally induced machine influences, the outer diameter of the test worm is moved in advance for the exact positional alignment toward a reference surface such as a clamping apparatus for workpieces, whereby a sufficiently exact reference position of the worm is detected.

In the actual measuring procedure, the test worm is brought to the working axial distance of the toothed arrangement of the gear pair of test worm and worm wheel in that the test worm is moved via the radial movement X1 of the linear carriage in the direction of the worm wheel clamped on the machine table 30 and is brought into engagement therewith. The test worm and the worm wheel are now in engagement under real conditions.

A tangential movement of the test worm with respect to the worm wheel is effected by shifting the working head 20 along the V1 axis. The rotational flank play of the worm wheel can be determined using the positional regulation parameters of the machine axis V1.

Alternatively, the tooth space width can also be determined by rotation of the worm wheel about the vertically standing C2 axis up to the tooth contact between the test worm and the worm wheel. The calculation of the tooth space width takes place from the positional regulation parameters of the C2 machine axis. The rotational flank play of the engaged gear pair is fixed by a rotation of the test worm about the B1 axis in both directions of rotation. The determination of the rotational flank play takes place using the positional regulation parameters of the B1 axis.

During the movement in accordance with the present disclosure, the test worm is set into rotation about the axis B1 via the direct drive of the working head 2 and is contacted at the working flank of the worm wheel to be tested. The movement of the test worm effects a rotational movement of the worm wheel or of the machine table 30 about the rotational axis C2. The selected direction of rotation of the test worm defines the working flank to be examined, i.e., the right hand flank and the left hand flank of the worm wheel.

To avoid any lifting of the tooth flank of the test worm from the worm wheel flank, a small braking torque, which counters the rotating movement about the rotational axis C2, is applied by the table motor. At the same time, the recording of the adopted rotational position takes place via the measuring system of the machine table 30. The control software of the gear cutting machine 10 makes an electronic comparison of the actually detected actual position of the machine table 30 with a stored ideal desired position and thus obtains the rotational position deviation which occurs. As a rule, the rotational position deviation per tooth of the worm wheel to be tested is determined within a complete revolution. Starting from this, various values can be calculated, namely the single-flank rolling gear deviations of the gear pair.

Figure 2:
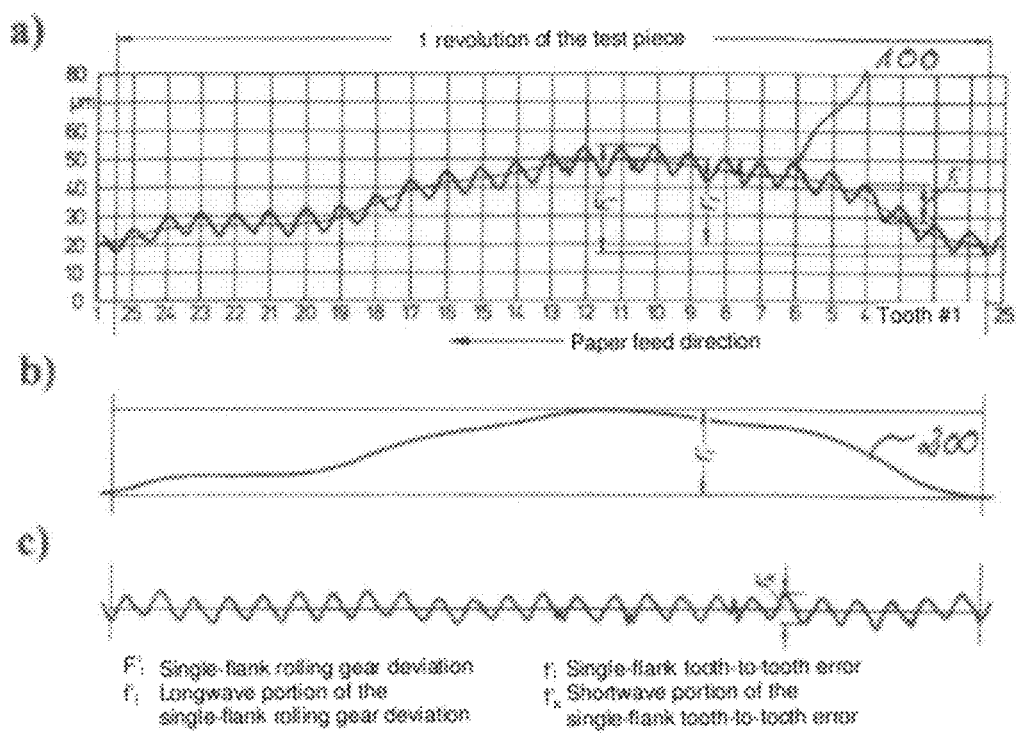
FIG. 2 shows measured value diagrams of the method in accordance with the present disclosure.

FIG. 2 shows three measured value diagrams which are used by the machine control for the determination of the individual deviations. The test pattern line 100 shown in FIG. 2a shows the detected rotational position deviation of the operated cylindrical pair per tooth number of the test piece. The test piece in the shown measured value diagram has teeth over a complete revolution 25.

The drawn single-flank rolling gear deviation $F'_i$ is the fluctuation of the actual rotational position with respect to the ideal desired rotational position. This results from the difference of the largest leading and the largest trailing rotational position deviation with respect to a defined initial value within a revolution of the worm wheel to be tested. In the measured value diagram shown, the selected initial value falls on the tooth spacing between the first and last teeth of the worm wheel.

The marked single-flank tooth-to-tooth error $f'_i$ is the largest possible difference which occurs between two rotational position deviations which occurs on a tooth engagement within the duration of the corresponding rotational angle.

Furthermore, a longwave portion $f'_l$ and a shortwave portion $f'_k$ of the single-flank rolling gear deviation is determined for characterizing the worm wheel to be measured. The longwave portion $f'_l$ can be determined from the test pattern shown in FIG. 2b by calculating and drawing the "polyline creating a mean" 200 in which the shortwave portions of the rotational position deviations are suppressed. An adjusted representation of the "polyline creating a mean" 200 can be seen from FIG. 2b.

The shortwave portion $f'_k$ (FIG. 2c) of the single-flank rolling gear deviation in contrast only takes account of the shortwave portion of the detected rotational position deviation. These portions result from the differences between the recorded test image line 100 and the "polyline creating a mean" 200. The frequency per wheel circumference of the shortwave portions normally coincides with the tooth number of the workpiece to be tested. These portions can, however, also contain the influences of the linear shape deviations of the sections or flanks.

Figure 3:
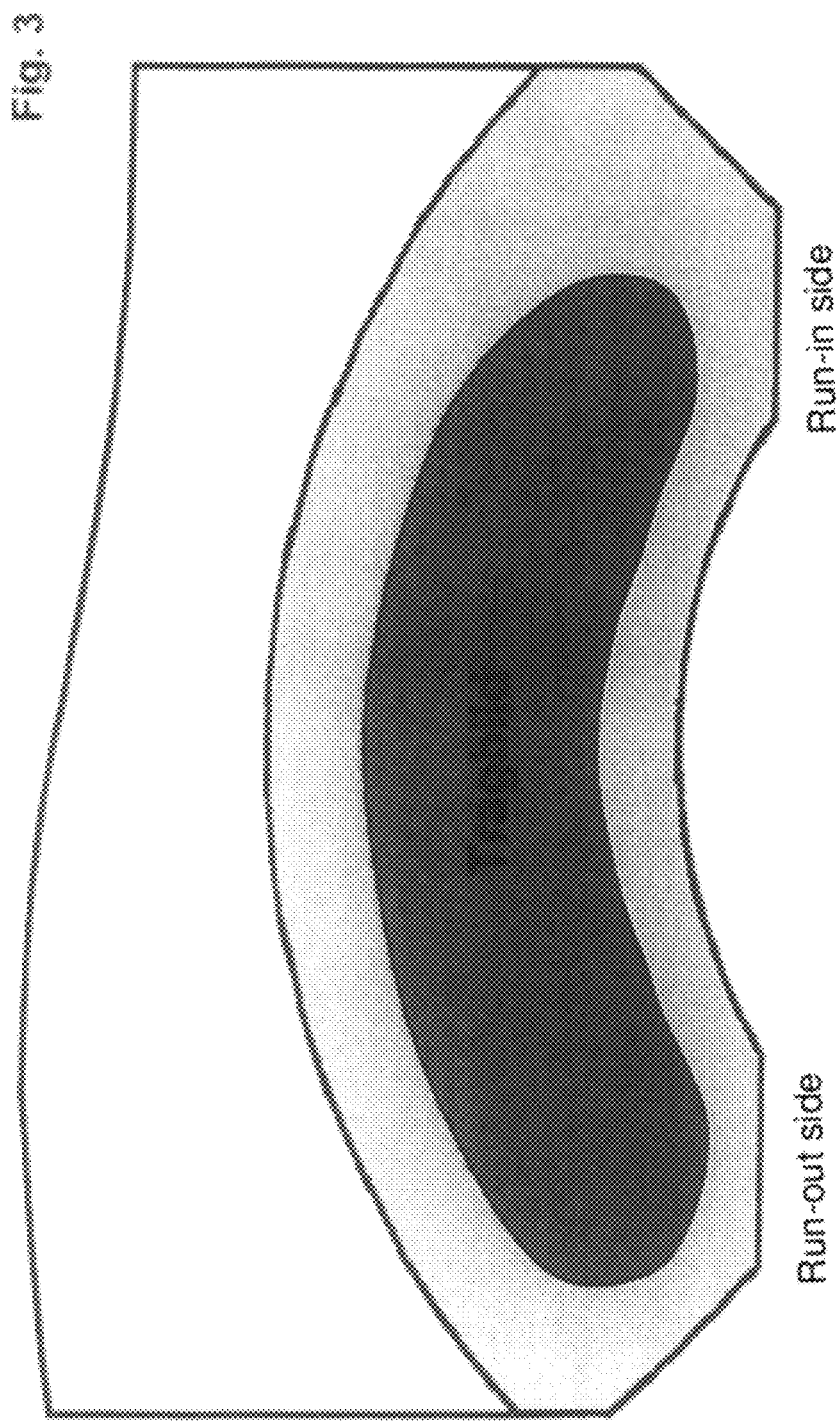
FIG. 3 shows a contact pattern at the gear wheel.

Additional information can be acquired from the single-flank rolling gear test if it is combined with a contact pattern test. In this respect, the test worm mounted at the working head 20 is colored manually or under machine control using a marker color, also called engineer's blue, and subsequently a known contact pattern test is carried out. The contact pattern prepared, such as can be seen from FIG. 3, for example, fan either be manually tested and evaluated by the machine operator or can alternatively be evaluated fully automatically by an image processing system integrated in the control unit of the CNC machine 10. The integration of the contact pattern test allows the evaluation of the contact relationships during the rotational transmission. The contact pattern test is in particular a proven approach for the extended monitoring of the production quality with worm wheel pairs.

An automatic tool change allows the automatic and reversible replacement between cutter and test worm. The test worm can be loaded fully automatically into the machine and/or stored within the machine with the aid of a suitable loading apparatus, for example a ring loader. The automatic change allows the use of the method within the mass production of gears.

If deviations are detected in the measurements, the worm wheel can be immediately corrected and can subsequently be repeatedly measured after the replacement of the test worm with the worm cutter.

The presented manner of testing is above all suitable with machines having direct drives in the B1 and C2 axes, but can optionally also be used in gear cutting machines having gear tables or gear heads.

In a second embodiment of the method, however, machines having conventional axial drives can also be used for carrying out the method in accordance with the present disclosure. In accordance with this embodiment, the worm wheel clamped in the tool mount is likewise driven via the provided test worm.

Figure 4:
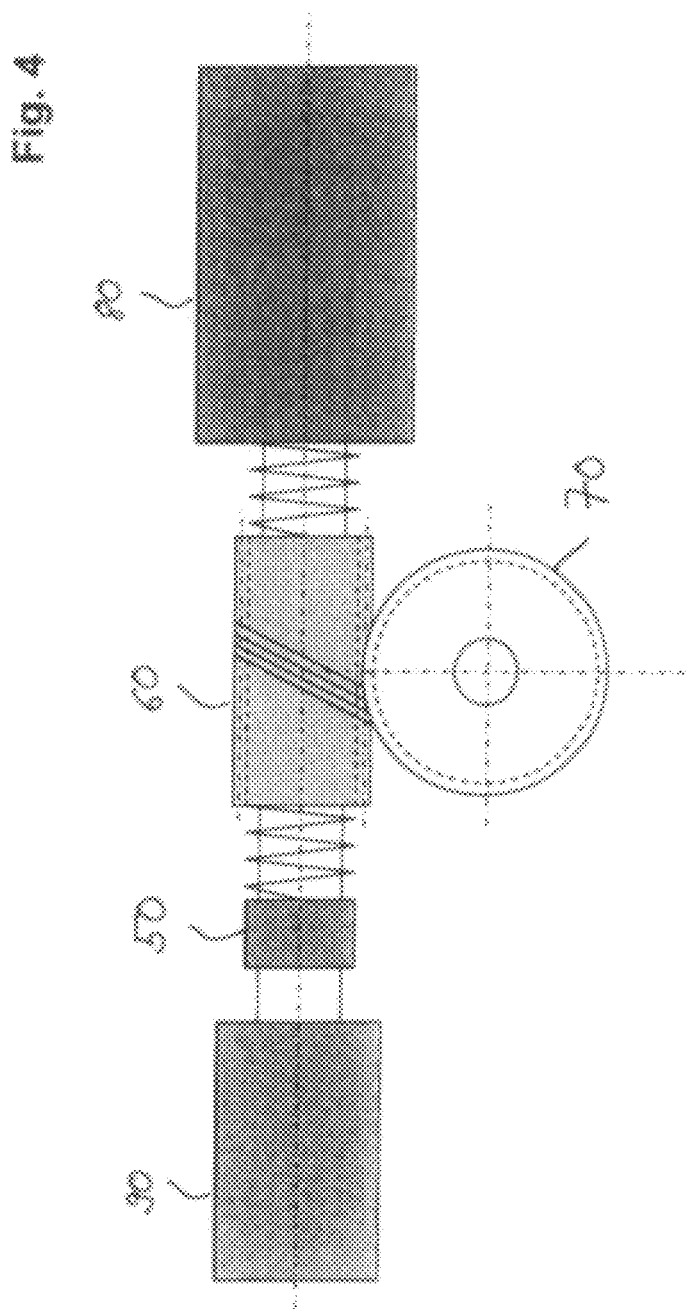
FIG. 4 shows a schematic representation of the measuring arbor.

The test worm is mounted either on a provided special cutting arbor or is mounted on the working arbor, with a rotation of the test worm about the B1 axis being generated independently of the arrangement. A schematic representation of the measuring arbor can be seen from FIG. 4.

A measuring system 50 in the form of a pressure load cell is arranged beside the test worm 60 on the special cutting arbor supported by the main bearing 80 and the counter bearing 90. The test worm 60 is pressed with spring loading toward the gear wheel 70 and is driven at constant speed about the B1 axis, whereby the worm wheel 70 rotates about the axis C2. Fluctuations in the rolling gear deviation of the gear pair 60, 70 result in a transposition of the mating test piece 60 relative to the workpiece 70 and consequently in a variation of the forces which are applied to the test worm 60 and which act in the direction of its worm axis (V1). The pressure load cell is relieved or additionally loaded depending on the force direction. The output signal serves as a reference signal for determining rolling gear deviations. The measured values for the single-flank rolling gear test can then likewise be calculated therefrom by the known gear ratio. The presented method is in particular used when the performing gear cutting machine has a large, and particularly sluggish geared motor in the machine table 30.

Alternatively the transposition of the mating test piece 60 relative to the workpiece 70 can be determined directly by a measuring system 50 arranged at the special cutting arbor in the form of a displacement transducer, for example a measuring sensor or an inductive measurement sensor. The pressure load cell can be omitted in this case.

In a third embodiment of the method in accordance with the present disclosure the test worm is mounted on the cutting arbor. Rolling gear deviations in the cooperation of the test worm with the worm wheel have an impact in the form of force variations in the direction of the machine axis V1. The motor driving the V1 axle must regulate the position of the machine axis during operation. The magnitude and direction of the positional regulation or of the required positional regulation torque is evaluated as a signal for the rolling gear deviation to be measured.

On an optional contact pattern test by marking color, the influences of a possible correction of the cutter pivot angle on the contact pattern can additionally be tested by the modification of the pivot angle of the A1 axis.

Analogously to the first embodiment, the single-flank rolling gear deviation $F'_i$, the single-flank tooth-to-tooth error $f'_1$; and the longwave and shortwave portions $f'_l$ $f'_k$ of the single flank rolling gear deviations are calculated from the force deviations for the second and third embodiments of the method. An optional contact pattern test and the automatic tool change with following correction proposals and reworking are likewise components of the second and third embodiments of the method in accordance with the present disclosure.

The second and third embodiments take place with rolling gear coupling. The deviation in the rotational transmission produces a transposition of the mating test piece or, indirectly, a force change on the mating test piece in a specific direction (leading/trailing). A measured signal can be generated from this which provides information on the transmission uniformity. In the third embodiment of the method, the V1 axle motor must hold the V1 axis constant in its position (F=const). The regulation signals required for this purpose deliver the measured signal.

No rolling gear coupling in the sense of a positional regulation is possible in the first embodiment of the method. A rotational movement is predefined by the mating test piece here and the deviation from the ideal rotational transmission is acquired as the measured result and is compared with the theoretically ideal rotational transmission.

The previously explained statements deal with the measurement of worm wheels. The method embodiment can, however, easily be used in an analog manner in the measurement of worms having a test worm wheel. Equally, other gear pairs such as cylindrical gears or spur gears can be examined.

Figure 5:
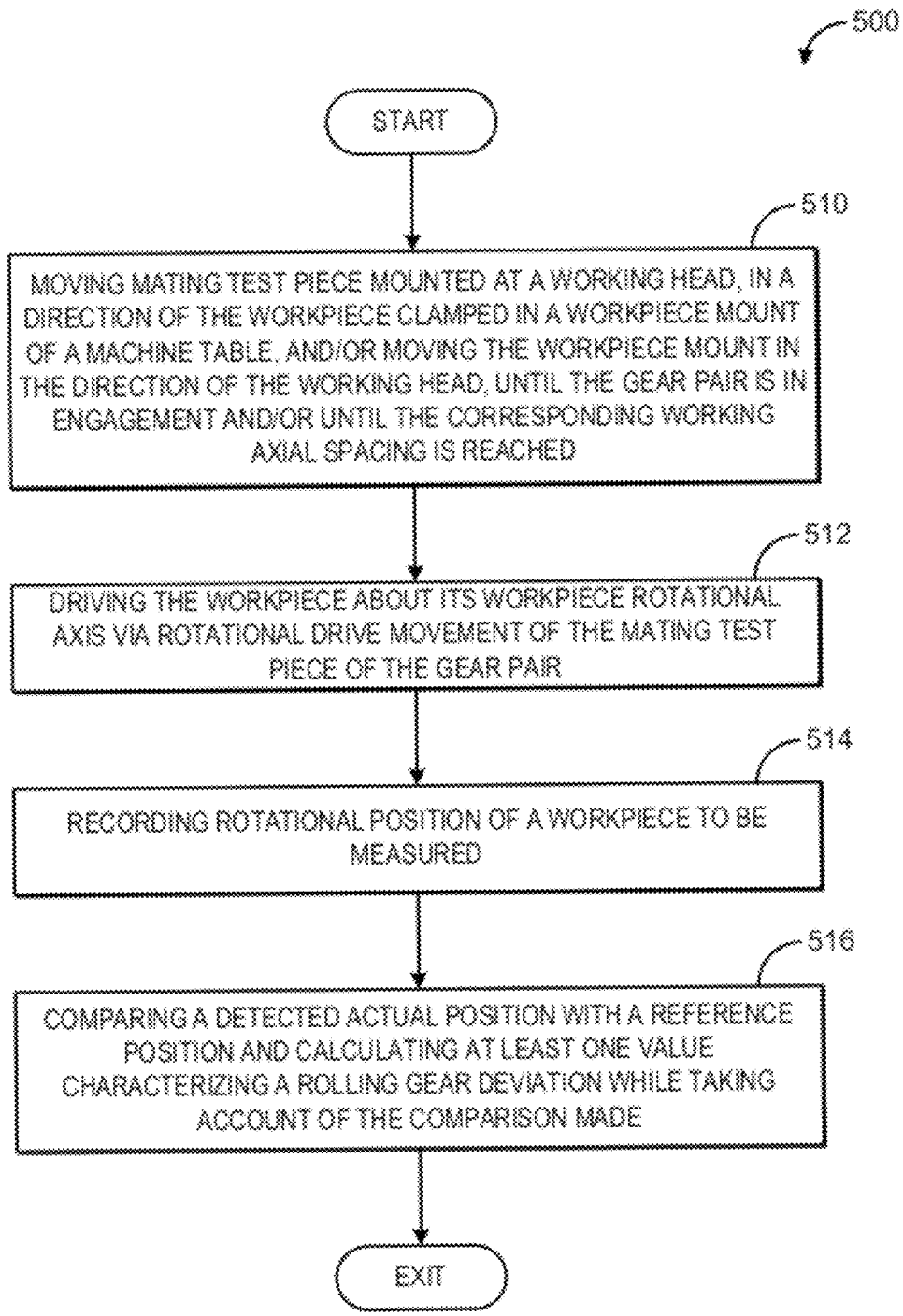
FIG. 5 is a flow chart illustrating a method for measuring and testing a workpiece belonging to a gear pair according to an embodiment of the present disclosure.

FIG. 5 shows one example method 500 that may be performed by the control unit. The method 500 may be for measuring and testing a workpiece belonging to a gear pair, wherein the method is carried out on a gear cutting machine producing the workpiece and the gear pair is either a worm gear or a cylindrical gear pair. The method may include at 510 moving a mating test piece mounted at a working head, in a direction of the workpiece clamped in a workpiece mount of a machine table, and/or moving the workpiece mount in the direction of the working head, until the gear pair is in engagement and/or until the corresponding working axial spacing is reached. Next, at 512, the method may include driving the workpiece about its workpiece rotational axis via rotational drive movement of the mating test piece of the gear pair. Next, at 514, the method may include recording rotational position of a workpiece to be measured. Next, at 516, the method may include comparing a detected actual position with a reference position and calculating at least one value characterizing a rolling gear deviation while taking account of the comparison made. Further, various additional or alternative features of the method may be included as described herein.

The invention claimed is:

1. A method for measuring and testing a workpiece belonging to a gear pair, wherein the method is carried out on a gear cutting machine producing the workpiece and the gear pair is either a worm gear or a cylindrical gear pair, comprising the method steps of:
   a. moving a mating test piece mounted at a working head, in a direction of the workpiece clamped in a workpiece mount of a machine table, and/or moving the workpiece mount in the direction of the working head, until a working axial spacing is reached;
   b. driving the workpiece about its workpiece rotational axis via rotational drive movement of the mating test piece of the gear pair; and
   c. calculating at least one value characterizing a rolling gear deviation of the workpiece, wherein a tooth contact between the workpiece and the mating test piece is determined by monitoring positional regulation parameters of corresponding machine axes.

2. The method in accordance with claim 1, further comprising;
   recording a rotational position of the workpiece to be measured; and
   comparing a detected actual position with a known reference position, wherein the calculation of at least one value characterizing the rolling gear deviation of the workpiece is based on the comparison made.

3. The method in accordance with claim 2, further comprising moving a reference surface to an outer diameter of the mating test piece to compensate thermal machine influences.

4. The method in accordance with claim 2, wherein, before the driving of the workpiece, its tooth space width is determined in that the mating test piece is shifted tangentially to the workpiece and/or the workpiece is rotated with respect to the mating test piece about its workpiece rotational axis until a tooth contact can be determined between the workpiece and the mating test piece.

5. The method in accordance with claim 2, wherein, before the driving of the workpiece, rotational play of the gear pair is determined in that the mating test piece is rotated in two directions about its rotational drive axis until a tooth contact can be determined between the workpiece and the mating test piece.

6. The method in accordance with claim 2, further comprising applying a small braking torque to the workpiece to avoid a lifting of a tooth flank of the mating test piece from a tooth flank of the workpiece.

7. The method in accordance with claim 2, wherein at least one value characterizing the rolling gear deviation of the workpiece is a single-flank rolling gear deviation of the gear pair and/or a single flank tooth-to-tooth error of the gear pair and/or a longwave and/or shortwave portion of the single-flank rolling gear deviation of the gear pair.

8. The method in accordance with claim 2, wherein at least one of the values characterizing the rolling gear deviation of the workpiece is output visually, and/or is archived for a subsequent statistical evaluation within a mass production.

9. The method in accordance with claim 2, wherein a fully automatic tool change takes place in the gear cutting machine between the tool and the mating test piece before and/or after an end of the measurement.

10. The method in accordance with claim 2, wherein at least one correction proposal for a reworking of the measured workpiece is put forward in dependence on at least one of the calculated values and/or an automated reworking of the workpiece takes place in dependence on at least one of the calculated values.

11. The method in accordance with claim 2, wherein the gear cutting machine is for machining and measuring a worm wheel/worm and/or a cylindrical gear.

12. The method in accordance with claim 2, wherein the mating test piece is arranged on a tool arbor between at least one spring package and at least one pressure load cell, and wherein a device for recording pressure fluctuations detected by the pressure load cell is provided.

13. The method in accordance with claim 2, wherein the respective rotational position of the workpiece to be measured is recorded over a specific period of time.

14. The method in accordance with claim 2, wherein the known reference position corresponds to a comparable gear pair with an almost ideal shape and dimensional deviation of the partners involved in the engagement.

15. The method in accordance with claim 2, wherein a contact pattern test of the workpiece is carried out in a subsequent method step, wherein the contact pattern is evaluated by an image recognition.

16. The method in accordance with claim 15, wherein an influence of a possible correction of a tool pivot angle on the contact pattern is tested by modification of the pivot angle of the mating test piece during the contact pattern test.

* * * * *